Feb. 7, 1956  B. H. CISCEL  2,733,878
STEERING APPARATUS FOR ROTATING WING AIRCRAFT
Filed June 11, 1952  3 Sheets-Sheet 3
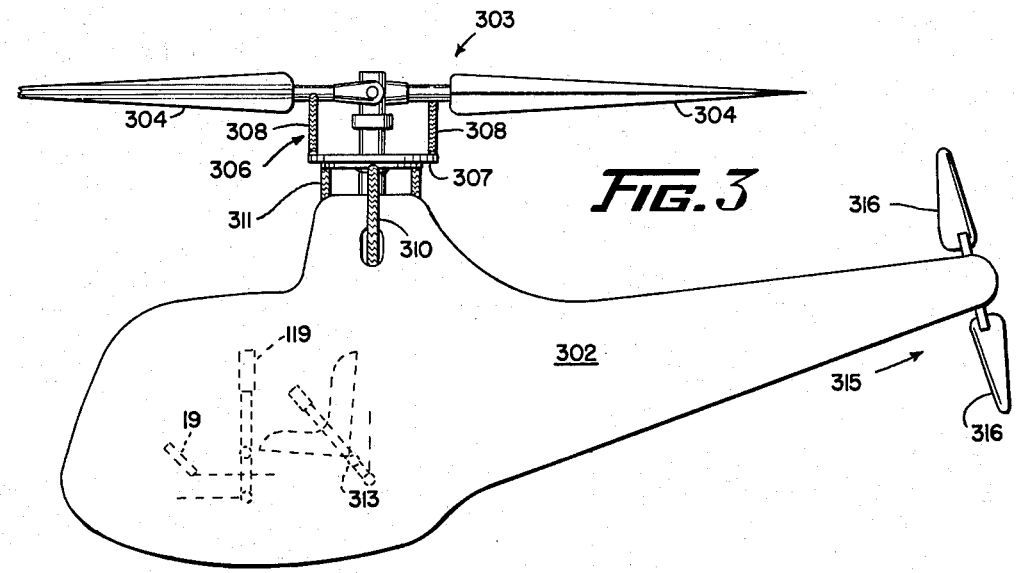
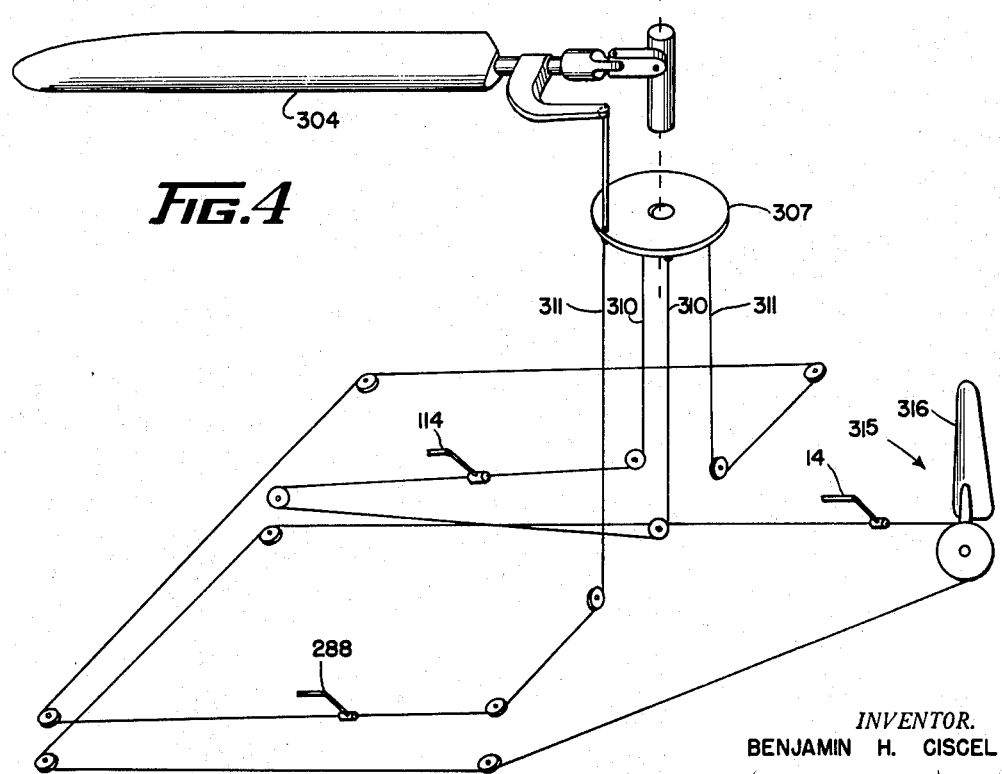
INVENTOR.
BENJAMIN H. CISCEL
BY
ATTORNEY

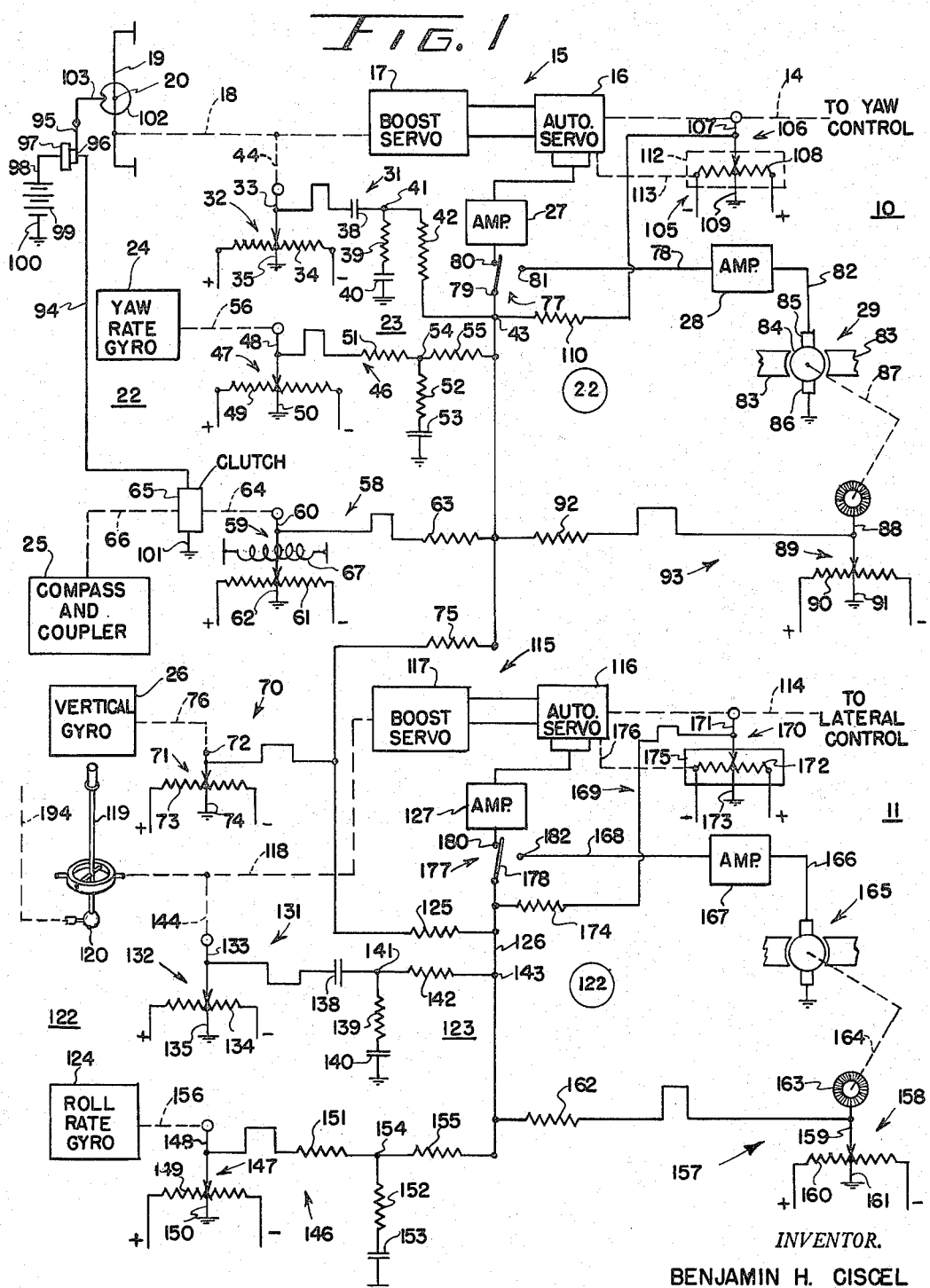

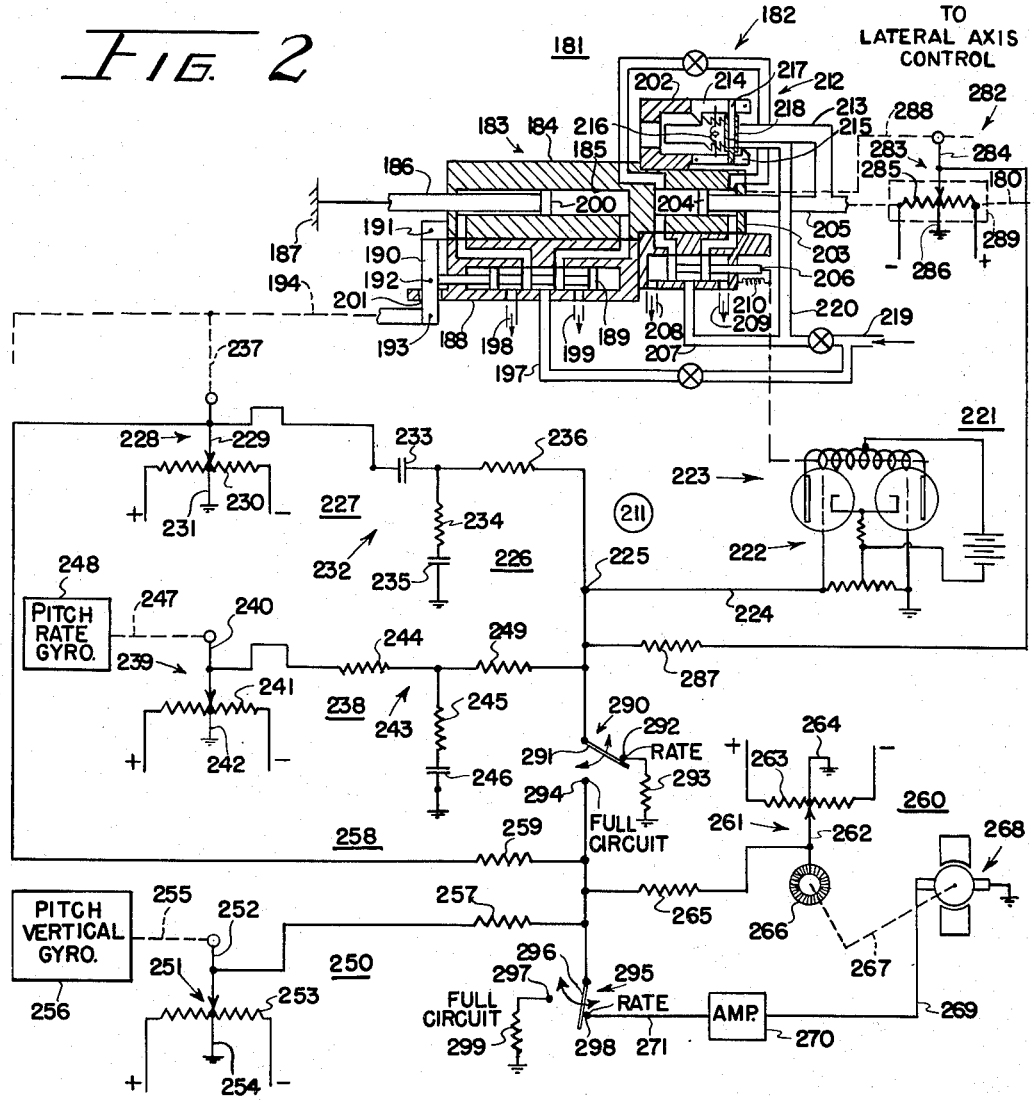

United States Patent Office 2,733,878
Patented Feb. 7, 1956

2,733,878

STEERING APPARATUS FOR ROTATING WING AIRCRAFT

Benjamin H. Ciscel, Golden Valley, Minn., assignor to Minneapolis-Honeywell Regulator Company, Minneapolis, Minn., a corporation of Delaware Application June 11, 1952, Serial No. 292,878

19 Claims. (Cl. 244—17.13)

This invention pertains to steering apparatus for dirigible craft and more particularly to aircraft having control surfaces which may be operated to change the angular position of the craft about its longitudinal, lateral, and vertical or yaw axes. The invention has been specifically adapted to the operation of the control surfaces of a helicopter type of aircraft.

An object of this invention is to provide an autopilot using differential servomotors for controlling the pitch of the rotor blades of the sustaining rotor of a helicopter to control the attitude thereof; wherein the differential autopilot comprises a hydraulic servomotor that automatically positions the pitch adjusting mechanism for the rotor blades to stabilize the helicopter and which servomotor in addition may be manually controlled from the conventional control stick of the helicopter or by position maintaining devices.

It is a further object of this invention to provide a differential automatic pilot for a helicopter including a servomotor for adjusting the pitch angle of the rotor blades of the helicopter and which servomotor may be automatically and manually controlled and wherein the manual operation of the servomotor may be able to override the automatic operation of the servomotor.

A further object of this invention is to provide a differential automatic pilot for a helicopter including a servomotor which may be manually controlled and automatically controlled including means for recentering and locking the differentially operated servomotor upon failure of hydraulic pressure thereto.

It is a further object of the invention to provide a differential automatic pilot for a helicopter including a differential servomotor that may be directly manually controlled and automatically controlled from stabilizing means on the craft with means to introduce a correction in the stabilizing means during operation of the manual controller so that the automatic means will aid rather than resist a manually initiated maneuver.

It is a further object of this invention to provide a differential automatic pilot for controlling the pitch of the rotor blades of a helicopter which autopilot includes a differentially operable servomotor that may be manually controlled from the conventional control column or automatically controlled and in which said automatically controlled means comprises a manually operable controller, positioned from said column, that has no control effect with the control column displaced during steady state attitudes of the helicopter.

It is a further object of this invention to provide a differential automatic pilot for a dirigible craft that may be manually operated from the conventional craft control column and automatically from a stabilizing device operable with reference to rate of rotation about an axis of the craft and wherein its response is integrated before utilization in said automatic pilot.

The above and further objects of the invention will become more evident upon consideration of the following description in conjunction with the annexed drawing disclosing a preferred embodiment thereof. In said drawing:

Figure 1 discloses apparatus for adjusting the rotor controlling counter-torque on the aircraft and to cyclically adjust the pitch of the sustaining rotor blades to provide bank attitudes of the helicopter so that banked turns may be effected, and Figure 2 discloses means for cyclically varying the pitch of the sustaining rotor blades for controlling attitude about the lateral axis with a hydraulic servomotor of the differential type shown in detail therein.

Figure 3 is an external view of a helicopter controllable from the novel apparatus;

Figure 4 is a diagrammatic view showing the automatic control apparatus connected to the helicopter rotor pitch adjusting mechanism.

Referring to Figure 1, the dirigible craft to be controlled in the present instance and described hereinafter is typified by a helicopter having a sustaining rotor with adjustable pitch blades and a rotor for controlling the effect of counter-torque applied to the helicopter due to rotation of the rotor blades of the sustaining rotor. For varying attitude about the craft's yaw axis there is provided for the counter-torque rotor a control section 10 of an automatic pilot. For varying attitude about the craft's longitudinal axis there is provided for the sustaining rotor a control section 11 of the automatic pilot. Thus, autopilot section 10 controls the yaw attitude of the helicopter and autopilot section 11 controls the bank attitude of the helicopter.

The yaw control section 10 comprises an output member 14 extending to the pitch control arrangement for the counter-torque rotor of a conventional helicopter. The output member 14 is positioned by a hydraulic, differential type servomotor 15 having an automatic control section 16 and a manual control or boost section 17, to be described more fully hereinafter. The manual control section 17 includes a conventional slide valve controlled by an operating means 18 extending from a conventional rudder bar 19 pivoted to the helicopter at 20. Operation of the rudder bar 19 is communicated to the control valve in section 17 and results in the positioning of the output member 14 in accordance with the operation of the rudder bar 19. The automatic control section 16 of the servomotor 15 is controlled from an automatic pilot 22 including a balanceable electrical network 23. The balance of network 23 is controlled by a yaw rate gyroscope 24, a heading control device such as a compass and coupler 25, a vertical gyroscope 26, a centering motor 29, and a follow up arrangement 106. Any unbalance in the network 23 is applied to discriminator amplifier 27 which controls the positioning of a slide valve in section 16 to cause the operation of output member 14 in accordance with the extent of unbalance of network 23. During the time that the automatic pilot section 22 is not utilized to control section 16 the network 23 is maintained in a balanced condition by applying the unbalance of network 23 to a centering motor amplifier 28 which causes the operation of the centering motor 29 to effect the rebalance of network 23.

Balanceable network 23 comprises a direct manual control compensating signal generator 31, a yaw rate signal generator 46, a heading stabilizing signal generator 58, a bank attitude signal generator 70, a synchronizing signal generator 93 and a rebalancing signal generator 106. Signal generator 31 comprises a rudder bar position potentiometer 32 which comprises a slider 33 and a resistor 34 having a grounded center tap 35. Extending between slider 33 and the center tap 35 and connected in series relation are condenser 38, resistor 39, and condenser 40. A summing resistor 42 connects junction 41 of condenser 38 and resistor 39 to a summing point 43 of the parallel summing electrical network 23. Slider 33 is positioned along resistor 34 by an operating connection 44 extending thereto from the boost section valve operating member 18. Signal generator 46 comprises a yaw rate potentiometer 47 including a slider 48 and resistor 49 having a center tap 50 connected to ground. Extending from slider 48 to center tap 50 and connected in series relationship are a resistor 51, a resistor 52, and a condenser 53. A summing resistor 55 connects junction 54 of resistors 51, 52 to a point common with summing point 43 of network 23. Slider 48 is positioned along resistor 49 in accordance with the rate of yaw of the craft by an operating connection 56 forming the output member of a yaw rate gyroscope 24. The gyroscope 24 is of the type well known in the art having a rotor with two axes of freedom namely its spin axis and its precession axis. The precession axis is at right angles to the spin axis and restraining means limit angular movement about the precession axis in accordance with the rate of yaw of the craft. Signal generator 58 comprises a heading deviation potentiometer 59 including a slider 60 and resistor 61 having a grounded center tap 62. A summing resistor 63 connects slider 60 with a point common with summing point 43. Slider 60 is positioned along resistor 61 in accordance with changes in heading of the aircraft by an operating means comprising member 64, magnetic clutch 65, and member 66, the latter extending from a compass and coupler 25. The compass and coupler 25 are of the type wherein upon changes in heading detected by a compass an electrical voltage is set up in a compass signal generator which in turn effects operation of an amplifier. The amplifier in turn causes the operation of a servomotor to null the compass signal generator and simultaneously operates through a magnetic clutch to position slider 60. During manual changes in heading the clutch is deenergized and the slider is spring centered while the coupler signal generator is continuously nulled. The compass and coupler may be analogous to that disclosed in Patent 2,516,641 to Murphy wherein the compass 11, signal generator 13, along with its amplifier and motor 15 constitute the compass and coupler of the present arrangement. The signal transmitter 16 and magnetic clutch 17 of the reference patent correspond with potentiometer 59 and clutch 65 of the present arrangement. Upon deenergization of the magnetic clutch 65 slider 60 of potentiometer 59 is brought to the mid point of resistor 61 by centering spring 67 connected to the slider. The centering spring 67 corresponds with the centering means provided for signal transmitter 16 of the reference patent. The energization of magnetic clutch 65 is provided by a circuit comprising conductor 94 extending from the clutch, movable contact 96 on a lever 95, a stationary contact 97, conductor 98, battery 99, battery ground conductor 100, and return to clutch ground conductor 101. Contact lever 95 includes a laterally bent portion 103 and the end thereof engages in a detent in the cam 102 fixed to rudder bar 19 so that upon actuation of the bar 19 contacts 97 and 96 are separated to break the clutch energizing circuit. Signal generator 70 comprises a bank attitude potentiometer 71 including a slider 72 and resistor 73 having a grounded center tap 74. A summing resistor 75 extends from slider 72 to a point common with summing point 43 of network 23. Slider 72 is positioned along resistor 73 by an operating means 76 extending from the vertical gyroscope 26. The vertical gyroscope is of conventional type having a rotor with a vertical spin axis and suitably gimballed for rotation about two respectively horizontal axes. The gyroscope is so arranged in the craft that the slider 72 is moved with respect to resistor 73 in accordance with the attitude of the craft about its longitudinal axis. Signal generator 93 comprises a centering potentiometer 89 having a slider 88 and resistor 90. Resistor 90 has a grounded center tap 91. A summing resistor 92 extends from slider 88 to a point common with network summing point 43. Slider 88 is positioned along resistor 90 by an operating connection 87 driven from centering motor 29. Centering motor 29 is of the reversible D. C. energized type having permanent magnets 83, 83 supplying the motor field and an energized armature 84 with brushes 85, 86 bearing upon its commutator. The centering motor 29 is energized from the output of the centering motor amplifier 28. Amplifier 28 is of the direct current type well known in the art which in response to a small direct current input signal applied thereto supplies a larger direct current output for the control of the motor 29. An input conductor 78 for amplifier 28 extends to a centering motor amplifier contact 81 of a two position switch 77. The two position switch 77 includes a double throw manually operable switch arm 79 which may engage a servo amplifier contact 80 or the centering motor amplifier contact 81. The switch arm 79 is connected to the summing point 43 of the parallel summing electrical network 23. Signal generator 105 comprises a servo rebalance potentiometer 106 including a slider 107 and resistor 108 having a grounded center tap 109. A summing resistor 110 connects slider 107 to summing point 43 of network 23. Slider 107 is positioned along resistor 108 by the output member 14 of servo section 16. Resistor 108 is mounted on a base 112 secured to a member 113 integral with the valve housing of servo section 16. The potentiometer resistors 34, 49, 61, 73, 90, and 108 of the signal generators in network 23 are connected to a suitable source of unidirectional voltage of suitable magnitude. It is evident that the output voltage supplied by each of the various potentiometers has a magnitude depending upon the extent of movement of the individual sliders and a polarity dependent upon the direction of movement of the sliders from the center taps of the respective resistors.

Continuing to control section 11, an output member 114 of a differential servomotor 115 is adapted to operate the cyclic pitch control mechanism for varying the pitch of the sustaining rotor blades. The differential servomotor 115 includes an autopilot section 116 and a boost section 117 the latter being manually controlled. The servo boost section 117 includes a conventional slidable valve positioned by operating means 118 extending from the conventional control stick 119 of the helicopter. The control column 119 has a conventional cross pivotal mounting and this valve positioning results from rotation of column 119 about an axis parallel to the longitudinal axis of the craft. The servomotor section 116 of servomotor 115 is controlled from an automatic pilot section 122 including a balanceable electrical network 123. The balance of electrical network 123 is responsive to operation of the vertical gyroscope 26 and a roll rate gyroscope 124 to provide automatic control. Balanceable network 123 in its entirety comprises a bank attitude signal generator 70, a control stick position compensating signal generator 131, a roll rate signal generator 146, a synchronizing signal generator 157, and a rebalancing signal generator 169. Signal generator 70 comprises the roll attitude potentiometer 71 previously described with reference to yaw control section 10 of the automatic pilot. A summing resistor 125 connects slider 72 of potentiometer 71 to network output conductor 126. Signal generator 131 comprises a control stick position potentiometer 132 having a slider 133 and resistor 134, the resistor being provided with a grounded center tap 135. Extending from slider 133 to summing point 143 in series relationship are a condenser 138, a resistor 139, and a condenser 140. A summing resistor 142 connects junction 141 of condenser 138 and resistor 139 to the output conductor 126. Slider 133 is moved along resistor 134 by an operating connection 144 extending thereto from the control stick which operates the boost-section valve-positioning member 118. Signal generator 146 comprises a roll rate potentiometer 147 having a slider 148 and resistor 149. Resistor 149 has a grounded center tap 150. Extending from slider 148 to center tap 150 in series relationship are a resistor 151, a resistor 152, and a condenser 153. A summing resistor 155 connects junction 154 of resistors 151 and 152 to the output conductor 126 of network 123. Slider 148 is positioned along resistor 149 by an operating connection 156 connected thereto and extending from a roll rate gyroscope 124. The roll rate gyroscope is similar to the yaw rate gyroscope but precesses about its precession axis in accordance with the rate of roll of the aircraft. Signal generator 157 comprises a centering potentiometer 158 including a slider 159 and resistor 160 having a center tap 161 connected to ground. A summing resistor 162 connects slider 159 with the output conductor 126. Slider 159 may be positioned along resistor 160 by a manually operable knob 163 and may also be positioned by an operating connection 164 extending thereto from a centering motor 165. The centering motor 165 is of the type having a permanent magnet field and energized armature and may be similar to centering motor 29. The armature of the centering motor is energized from an output connection 166 extending from a centering motor amplifier 167. The amplifier 167 has an input conductor 168 extending thereto from a centering motor amplifier contact 182 of a single pole two position switch 177. The switch 177 includes a single pole double throw switch arm 178 connected to the output conductor 126 of network 123 and engageable alternatively with a servo amplifier input contact 180 or a centering motor amplifier input contact 182. Signal generator 169 comprises a rebalance potentiometer 170 having a slider 171 and resistor 172 with the resistor having a center tap 173 connected to ground. Slider 171 is connected to network conductor 126 by summing resistor 174. Slider 171 is positioned along resistor 172 by the output member 114 of the servomotor 115. The resistor 172 is supported upon a base member 175 which is supported by a member 176 so that it is integral with the piston housing of section 116. The potentiometer resistors 73, 134, 149, 160, and 172 in network 123 are connected to a suitable source of unidirectional voltage of suitable magnitude.

Passing to Figure 2, mechanism for operating the cyclic pitch control means of the helicopter for varying the pitch of the rotor blades of the sustaining rotor to provide change in attitude of the craft about its lateral axis is operated by an output member 180 of a hydraulic differential type servomotor 181. The differential servomotor comprises the automatic pilot section 182 and the manual or boost section 183. The manually controlled or boost section 183 of the servomotor 181 comprises a body member 184 having a cylinder 185 in which is positioned for reciprocation a piston and piston rod assembly 186. The piston rod is suitably connected at 187 to the body of the helicopter. The body member 184 has integral therewith a valve body 188 that houses a conventional slidable plug type valve 189 which as determined by its position serves to connect hydraulic pressure input fluid conductor 197 and fluid exhaust conductors 198, 199 to the sides of piston 200. The valve 189 is positioned by a differential lever 190 connected at one end by pivot 191 to body 184 and at its opposite end by pivot 193 to a manually operable member 194. An intermediate portion of the lever 190 is connected at pivot 192 to the valve 189. The operable member 194 is positioned through connection 120 by the conventional control column 119 of the helicopter (shown in Figure 1).

The position of the intermediate pivot 192 of lever 190 is so related to that of the end pivots 191 and 192 that a desired movement of the body 184 for a given movement of the manual controller 119 is provided. It is apparent that as the member 194 is adjusted to move the valve 189 to place pressure line 197 in communication with one or the other side of piston 200 that the subsequent movement of the body portion 184 and the consequent rotation of lever 190 constitutes a follow-up operation of the boost section of servomotor 181. The ease with which valve 189 may be positioned causes this follow-up to be achieved with no apparent or appreciable force being exerted by the operator on control lever 195 to provide the pivoting action of lever 190 about pivot point 193.

The automatic section 182 of the servomotor 181 includes a body member 203 having a cylinder within which reciprocates a piston 204 supported on a piston rod 205. The piston rod 205 operates the output member 180. The body member 203 integrally supports a valve body that houses a slidable control valve 206 which may be automatically positioned to alternatively place the opposed sides of the piston 204 in communication with fluid pressure inlet conduit 207 and outlet conduits 208, 209. The valve 206 is provided with conventional spring centering means 210 which center the valve with respect to the conduits or ports in body 203 upon removing of the control force on the valve.

Associated with the body member 203 and piston rod 205 is a centering and locking mechanism 212. Centering mechanism 212 comprises a ratchet bar 213 integral with piston rod 205 and having ratchet teeth on opposite sides thereof. The teeth on one side of said bar are slanted in the same direction to those on the opposite side of the bar. Integral with the body portion 203 is a supporting member 202 on which is pivoted a pawl 214 for engaging with one set of ratchet teeth and a pawl 215 engaging with the other set of ratchet teeth. The pawls 214 and 215 are biased into engagement with the teeth of the ratchet bar 213 by a spring 216 connected to intermediate points on said pawls. Pawl 214 is further connected to a piston 217 of a fluid actuator the cylinder 218 of which is connected to the other pawl 215. A subconduit 220 connects the actuator cylinder with the main pressure line 219 so that upon the existence of a pressure in the conduit the pawls 214 and 215 are moved by the pressure in the actuator out of engagement with the respective teeth on ratchet bar 213.

The body portion 184 of boost section 183 and the body portion 203 of automatic control section 182 are integrally connected. Furthermore the differential lever 190 that controls the positioning of slide valve 189 passes through a slot 201 in body portion 184 so that it has limited angular movement relative to the body member. It thus will be evident during normal operation when pressure fluid is available that manual operation of the control lever 119 to position the valve 189 causes the movement of body portions 184 and 203 together with piston rod 205 to operate the output member 180. The operation of body member 184 in turn operates as a follow-up of the differential lever 190 to reposition valve 189. Furthermore, if the control valve 206 in the automatic section be operated the two body portions 183 and 203 along with piston rod 186 will be held fixed relative to the craft and the piston rod 205 will operate the output member 180. Movement of the piston rod 205 will also carry with it the ratchet bar 213. It is thus evident that the piston rod 205 is operated differentially in accordance with the operation of the control stick 119, the operation being about an axis parallel to the lateral axis of the craft, which operates valve 189 and the automatic control which operates the valve 206.

Upon failure of the high pressure fluid supply to the servomotor 181 such as might occur by rupture of conduit 219 it is desirable to be able to operate the control surfaces of the helicopter by the manual control column 119, and it is furthermore desirable that when hydraulic failure occurs that a normal positional relationship between the control column 119 when it is in a normal or vertical position and the normal position of the control surface or rotor blades of the sustaining rotor corresponding to this control stick position be obtained. The centering and locking means 212 provides this normal relationship as will be explained. If the automatic control valve 206 has been operated and has caused piston rod 205 to move to the right, the upper pawl 214 will not engage any ratchet teeth and the lower pawl 215 may be engaged with its associated ratchet teeth. Upon failure of hydraulic pressure, the operator may move the control stick 195 to the right. Due to the slot 201 very little relative movement between the member 194 and the body member 184 is permitted before the body members 184 and 203 are adjusted directly by movement of the control lever 119. By moving the two body members to the right, the lower pawl 215 will also be moved to the right and will ratchet over the lower teeth on bar 213 whereas the upper pawl 214 has not as yet engaged its ratchet teeth since it is adjacent the portion of the bar not carrying teeth. Thus movement of the two body members may be made manually until the pilot realizes that the upper pawl has engaged the teeth on ratchet bar 213, as evident from the operation of the cyclic pitch control mechanism. The operator then may move the control column 195 in the reverse direction at which time the upper pawl 214 and lower pawl 215 will engage their associated teeth on the ratchet bar and no ratcheting or movement of the bar 213 relative to the support member 202 will occur. The piston rod 205 is thereby centered and locked to the control stick 195 in a predetermined position.

The valve 206 in the automatic servo section 182 is controlled by an automatic pilot section 211 being positioned by an electromagnetic actuator-discriminator amplifier device 221 therein. The amplifier section 222 of the device is of the direct current discriminator type and causes the electromagnetic actuator 223 to move the valve 206 in one or another direction depending upon the polarity of a control signal supplied to the amplifier 222. The actuator and valve may both be mounted on the body 203 or both may be supported on the craft independent of the body 203 with flexible leads connecting the valve and body. The amplifier 222 may be of a conventional electronic type which has control signals supplied to the control electrode thereof by a conductor 224 connected to a summing point 225 of a parallel summing variable impedance network 226 of the automatic pilot.

Network 226 comprises a control stick position compensating signal generator 227, a craft pitch rate signal generator 238, a pitch attitude signal generator 250, a stick position displacement signal generator 258, a synchronizing signal generator 260, and a rebalancing signal generator 282. Signal generator 227 comprises a stick position potentiometer 228 having a slider 229 and resistor 230 with the resistor 230 having a center tap 231 connected to ground. Connected across slider 229 and center tap 231 is a network 232. Network 232 comprises condenser 233, resistor 234, and condenser 235 connected in series. A summing resistor 236 connects the junction of condenser 233 and resistor 234 to the summing point 225 of network 226. Slider 229 is positioned along resistor 230 by an operating means 237 extending from the boost servo section valve operating linkage 194. Signal generator 238 comprises a potentiometer 239 having a slider 240 and resistor 241. A center tap 242 of resistor 241 is connected to ground. An integrating network or lagged rate network 243 comprising resistors 244, 245 and condenser 246 connected in series relation extends across the slider 240 and center tap 242. A summing resistor 249 connects the junction of resistors 244, 245, to the summing point 225 of the network. The slider 240 is positioned along resistor 241 by a suitable operating connection 247 extending thereto from a pitch rate gyroscope 248. The pitch rate gyroscope 248 is similar to the yaw rate gyroscope 24 but is arranged in the aircraft to be responsive to the rate of pitch thereof. It serves to move slider 240 relative to resistor 241 in a direction and an extent depending upon the direction and magnitude of rate of pitch. Signal generator 250 comprises a pitch attitude potentiometer 251 having a slider 252 and resistor 253 with the resistor having a center tap 254 connected to ground. A summing resistor 257 connects slider 252 to summing point 225. Slider 251 is positioned along resistor 253 in accordance with craft pitch attitude by operating means from a conventional vertical flight gyroscope. Signal generator 258 comprises the control stick potentiometer 228 having slider 229 and resistor 230. A summing resistor 259 connects slider 229 to the summing point 225. Signal generator 260 comprises a centering potentiometer 261 having a slider 262 and resistor 263. The resistor has a center tap 264 connected to ground. A summing resistor 265 connects slider 262 with the summing point 225. The slider 262 may be manually positioned along resistor 263 by a manually operable knob 266 affixed thereto and may also be positioned by an operating member 267 extending thereto from a centering motor 268. The motor 268 is similar to motor 165 and has its armature energized by means of an output conductor 269 extending from a centering motor amplifier 270. The amplifier 270 may be similar to amplifier 167 and is supplied D. C. control voltages by an input conductor 271. Signal generator 282 comprises a follow-up potentiometer 283 having a slider 284 and resistor 285. Resistor 285 is provided with a grounded center tap 286. A summing resistor 287 connects slider 284 with summing point 225. Slider 284 may be supported by a suitable means 288 from the body portion 203 of servomotor 182 while resistor 285 may be supported on a base member 289 connected to the piston rod 205.

The control network 226 for controlling servo amplifier 222 may be constituted by a basic lagged rate autopilot control circuit or by the basic lagged rate autopilot control circuit plus a displacement signal and synchronization section. The two configurations of the control circuit as indicated in Figure 2 are effected by a manually operable two position switch 290 having a single pole double throw switch arm 291 connected to summing point 225 and engageable with a rate contact 292 which is connected by a loading resistor 293 to ground or engageable with a full autopilot circuit contact 294. When switch arm 291 engages contact 292, the control circuit 226 comprises only signal generators 227, 238, and 282. When switch arm 291 engages contact 294 the control circuit 226 comprises signal generators 227, 238, 258, 250, 260, and 282.

During the time that the signal generators 250, 258, 260 are not to be utilized during flight, these signal generators of the control circuit 226 may be maintained in a balanced condition by applying the output of said generators to the synchronizing motor amplifier 270. To this end, the signal generators 250, 258, 260 of control circuit 226 are connected to the manually operable switch arm 296 of the single pole double throw switch 295. During the time that the control network 226 constitutes solely a basic lagged rate autopilot circuit, switch arm 291 engages contact 292 and switch arm 296 engages contact 298. During this time, signal generators 258, 250, and 260 control the energization of centering motor amplifier 270 which operates the centering motor 268. The motor 268 in turn operates slider 262 to maintain this portion of the amplifier network 226 in balanced condition.

Reverting to the resistance capacitance networks 243 and 232, it will be apparent that the sub network 243 is not a true or pure integrator and therefore the output voltage supplied to amplifier input network 226 by means of this sub network 243 is a combination of rate and integrated rate termed displacement voltage. The rate component provides the damping effect on angular movements of the craft and the integrated rate component provides an equivalent to a datum. The time constants of this capacitor-resistor circuit have been selected to provide an output rate component giving good damping at the natural frequency of oscillation of the helicopter and a gain factor selected to provide high steady-state sensitivity to low rates. The rate damping effect is provided by the in-phase component of the total output voltage from sub network 243 supplied to amplifier input network 226 that is derived from the rate gyroscope potentiometer 239.

Further understanding of this circuit may be had by studying the response expression which is derived below. The elements of network 243 may be arranged to form a voltage divider with one first series resistive element 244 (called $R_1$) and a shunt impedance composed of second and third resistive elements 245 and 249 (called $R_2$ and $R_3$ respectively) and capacitive element 246 (called $C$). As a further simplification, the signal source impedance is included in $R_1$ and the summing point impedance is included in $R_3$.

The shunt elements may be combined into an impedance expression as follows:

$$Z_0 = \frac{R_3(1+R_2Cj\omega)}{1+R_2Cj\omega+R_3Cj\omega}$$

The transfer function, or expression which indicates the relationship between the output voltage and the input voltage, may be written as follows:

$$F = \frac{E_o}{E_{in}} = \frac{Z_0}{R_1+Z_0}$$

Substituting for $Z_0$ and simplifying, we have:

$$\frac{E_o}{E_{in}} = \frac{R_3(1+R_2Cj\omega)}{R_1(1+R_2Cj\omega+R_3Cj\omega) + R_3(1+R_2Cj\omega)}$$

$$= \frac{(1+R_2Cj\omega)}{1+R_2Cj\omega+R_1Cj\omega+\frac{R_2R_1}{R_3}Cj\omega+\frac{R_1}{R_3}}$$

Because the time constants of the circuit must be properly related to the dynamic behavior of the craft to be stabilized, the expression is more useful rewritten in a form which shows these time constants:

$$\frac{E_o}{E_{in}} = A\frac{1+T_1j\omega}{1+T_2j\omega}$$

Here A is a factor $$= \frac{R_3}{R_3+R_1}$$

which shows the attenuation at zero frequency for this network alone. For frequencies other than zero the attenuation increases because of the decreasing reactance of the capacitor, and it is this fact of higher attenuation with frequencies other than zero which permits a high steady-state gain to stabilize low drift rates without compromising the proper dynamic stability at the natural frequency of the aircraft. The two time constants are as follows:

$$T_1 = R_2C$$

$$T_2 = \frac{C\left(R_1+R_2+\frac{R_1R_2}{R_3}\right)}{1+\frac{R_1}{R_3}}$$

From the expressions for the time constants, it can be seen that $T_2$ is ordinarily larger than $T_1$. (Some typical valves chosen for a helicopter have $T_1$ about one second and $T_2$ about four seconds.) Over a range of frequencies, the phase shift of the output of this network with respect to the input will be zero at zero frequency, begin lagging as frequencies increase, rise to a maximum lag at some frequency determined by the ratio of $T_2$ to $T_1$, and then the phase lag decreases, ultimately returning to zero at very high or infinite frequency. This phase characteristic is important in the stabilization system because it provides a limited phase lag, as contrasted with many networks whose phase characteristic shows increasing phase lag with frequency.

The advantages from using this type of circuit for this application may be restated as follows: The system gain (from the rate gyro to the servomotor) may be set higher for zero frequency operation or low drift rates, without having too much damping from rate gyroscope 248 and network 243 at the natural frequency of the aircraft, because of the attenuation characteristic of the network. The network helps provide better dynamic stabilization because of the lagging nature of the phase characteristic since it provides from a rate gyro alone, an equivalent to a combination of rate plus displacement signals. The network, because of its limited phase lag does not present problems of stabilization at higher frequencies as would occur if a network of greater phase lag were used.

The resistor capacitor sub network 232 has been selected so that the voltage across the resistor 234 and condenser 235 which is the output voltage of this sub network applied to the amplifier input network 226 is substantially the same during maneuvering as the voltage applied to the control network 226 as measured by the voltage across resistor 245 and condenser 246 of sub network 243. The condenser 233 while permitting transient effects to pass during displacement of control stick 195 from its normal position nevertheless prevents the application of a steady-state signal to the balanceable amplifier network 226. Thus the two networks 232 and 243 chosen so as to result in good maneuverability of the aircraft through the manual controls without compromising the stabilizing performance of the autopilot.

Furthermore when the craft has attained a desired attitude as determined by operation of the control column 195 at which time the rate of change of pitch attitude will be zero and the output from RC network 243 to amplifier network 246 will be zero, the amount that control column 195 must be held off normal position to hold this attitude and which is reflected in the adjustment of slider 229 of potentiometer 228 is prevented by the condenser 233 from being applied to the amplifier network 226. Thus there is no output voltage from RC sub network 232 and no output from RC sub network 243 when the craft is held in any steady-state position by the manual controller 195.

There is a further advantage to the dynamic stabilization characteristics or the lagged rate autopilot shown in Figure 2 (with the switch 290 in the rate position) and composed of the servo element 181, rate gyro 248, potentiometer 239, control potentiometer 228, feedback potentiometer 283, amplifier 221, and RC sub networks 232, 238, and summing resistors 236, 249, and 287. This further advantage is that it is an autopilot which does not require a synchronization or automatic centering device, such as amplifier 270, motor 268 and trim potentiometer 261. That is, the basic lagged rate autopilot can be engaged in any attitude and with any position of the manual stick without a bump, even without a centering device such as is common to many automatic pilots. This is so because the autopilot servo 182 is centered by the automatic centering device 212 and the control stick signal from potentiometer 228 has no effect because of the blocking action of capacitor element 233. Thus there are no steady-state signals to be balanced due to attitude or stick positions and therefore the trim is a manual adjustment which need only be done once.

Since the RC sub network 243 does not supply a true integration of pitch rate signal to the amplifier network 226 and therefore provides no true datum but one that generally must be supplemented by manual control, a standard of position such as the pitch attitude vertical gyroscope 256 may be included in the amplifier network 226 in order that the craft may be stabilized in a given pitch attitude. The vertical gyroscope 256 is incorporated in network 226 by moving switch arm 291 into engagement with contact 294 and switch arm 296 into engagement with contact 297. During such configuration of the amplifier network 226, the signal generator 258 controlled from the control column position potentiometer 228 supplies a signal to the balanceable network 226 that balances the voltage derived from pitch attitude signal generator 250 and supplied to the network 226 during steady-state so that the network 226 is balanced at attitudes selected by the operation of the manual controller 195. When the vertical gyro 256 is used in conjunction with the lagged rate system of rate gyro 248 and network 243 a further advantage of the use of that network can be pointed out. To change the pitch attitude of the craft, the human pilot initiates the maneuver by moving his manual control stick 119. This changes the controls directly through action of the boost section of the servo 183, and indirectly through the autopilot by reason of the signal from the control potentiometer 228. When the attitude is achieved, a signal from the vertical gyro 256 will be a measure of the change in attitude. This vertical gyro signal must be balanced by some other signal, and the usual source of this balancing signal is the control potentiometer 228. In an autopilot without lagged rate, the gain from the vertical gyro must be high to provide good dynamic stability, and this would result in a fairly large control stick 119 displacement to provide a balancing signal for the vertical gyro. With the lagged rate autopilot circuit, the vertical gyro voltage need not be as great to get equivalent dynamic stability, and hence new attitudes may be held with the manual stick 119 more nearly centered.

It will also be apparent that when the control column 119 is not being operated, that the gyroscopes 248, 256 control their respective sliders to affect the balance of network 226 in such manner that the servomotor 182 is operated to maintain the craft at a predetermined position.

Although helicopter aircraft are not ordinarily equipped with automatic trim systems, and for that reason none is shown in the accompanying figure, a further advantage of the differential autopilot is the ease with which it provides an automatic trim signal. That is if the autopilot servo section 182 of combination servo 181 continually stays on one side or the other of its neutral position, that fact is indicated by the feedback potentiometer 283 and can be used to control an automatic trim system through an amplifier similar to 270 or a sector switch could be arranged similar to potentiometer 283 for direct control of a trim actuator.

In Figure 3, a helicopter 302 having a single sustaining rotor is shown diagrammatically. This illustrates one type of helicopter controllable from the automatic pilot. It should be understood however that other types of rotary wing aircraft could be likewise controlled by the mechanism hereinbefore described. The helicopter 302 includes a rotor 303 driven by an engine, not shown. A control mechanism 306 comprises a tilt plate 307 and rods 308 connected to rotor blades 304 to control the pitch and angle of attack of the rotor blades 304. Control means 310, 311 are connected to the tilt plate 307 and extend down into the body of the helicopter 302 as more fully shown in Figure 4.

Although there are several different forms of control mechanisms for varying the angle of attack of the rotor blades 304 the type illustrated herein can tilt the plate 307 to vary the angle of attack of the blades 304 cyclically and may also be moved simultaneously up and down to control the total pitch of the blades 304 for changing the lift of the rotor 303. The total pitch function is controlled by a control lever 313 through suitable connections not shown and not material here. Since the operation of the present invention does not depend directly upon the total pitch setting, this function will not be described.

The attitude of the helicopter and the direction of its movement are controlled by a control stick 119 through connections 118, 194, Figure 1 and Figure 2, to the amplifier control networks 122, 211. The network 122 through amplifier 127 and the servomotor 115 and output member 114 controls the operation of the control means 310, 310 to control the roll attitude of the craft. The control network 211 which is responsive to the fore and aft movements of the control stick 119 operates amplifier 221 to control the differential servomotor 181. The output member 288 of the differential servomotor 181 operates the control members 311, 311 to control the pitch attitude of the craft.

A torque compensating rotor 315 is mounted upon the tail section of the helicopter 302. The pitch adjustment of the rotor blades 316 of rotor 315 is effected through operating member 14, Figure 1. Member 14 is driven by a differential servomotor 15 which in turn is operated through amplifier 27 from network 23 including the potentiometer slider 33 operated from the rudder pedals 19 of the helicopter.

It will now be apparent that I have provided control apparatus for an aircraft which includes a differential hydraulic servomotor that may be manually or automatically controlled and which includes provisions for the servomotor acting as a locked or centered mechanical element between the control column and the control surface of the craft, upon loss of hydraulic pressure for operating said servomotor, and that said servomotor includes a section controlled by an automatic control system which includes a balanceable network that responds to operation of said manual control and stabilizing devices in the automatic control to facilitate automatic and manual control of the servomotor.

As various other embodiments of the invention might suggest themselves and as various changes may be made in the specific embodiment described, it is to be understood that this disclosure herein is to be construed as illustrative and not as defining the limits of the invention.

I claim as my invention:

1. Control apparatus for a helicopter having a sustaining rotor with articulated rotor blades rotating about a substantially vertical axis and movable means for selectively cyclically varying the pitch of said rotor blades with reference to the lateral and longitudinal axes of said helicopter, said helicopter having a manually operable control lever, in combination, a differential hydraulic servomotor having two integrally connected cylinders jointly movable in opposite directions and two power pistons one for each cylinder, a piston rod of one piston being secured to a fixed part of said helicopter and the piston rod of the other piston being connected to the movable means for operation thereof to cyclically vary the pitch of said rotor blades with reference to one of said axes, a control valve for the one cylinder; a lever having one end connected to the manual control lever and the other end connected to the cylinders with an intermediate point connected to the control valve whereby the valve is positioned from the control lever in the direction of the operating path of the cylinders and is reversely positioned by the movement of the cylinders; a position responsive device operated upon change in craft lateral position, a signal generating means, operating connections from said responsive device to said generating means, follow-up means responsive to relative movement of the cylinders and the other piston and connected to said generating means, and means controlled by said signal generating means for positioning the control valve of the other cylinder whereby differential operation of the movable means in accordance with the operation of said manually operable lever and said position responsive means is obtained.

2. Control apparatus for a helicopter having a sustaining rotor with multiple rotor blades rotating about a substantially vertical axis and movable means for selectively varying the direction of the resultant lift vector of said blades with reference to the lateral and longitudinal axes of said helicopter, said helicopter including a manually operable control lever, in combination, a hydraulic servomotor having two integrally connected first and second cylinders jointly movable in opposite directions with reciprocating pistons and control valves, the piston rod of the first piston being secured to a fixed part of said helicopter and the second piston rod being connected to the movable means to secure control about one axis, connecting means for positioning the control valve of the first cylinder from said manually operable lever, a position responsive device responsive to change in angular position of said craft about an axis, operable means controlled by said responsive device for positioning the control valve of the second cylinder, releasable locking means for integrally connecting the second piston with its cylinder maintaining said second piston fixed relative to said second cylinder, and pressure responsive means connected to the locking means for rendering said maintaining means ineffective, and thus disconnecting said second piston from its cylinder whereby upon failure of the pressure supplied to said hydraulic servomotor said second piston and said second cylinder are made relatively immovable to permit direct operation of said movable means manually.

3. Control apparatus for a helicopter having a sustaining rotor with articulated rotor blades rotating about a substantially vertical axis and movable means for selectively cyclically varying the pitch of said blades with reference to the lateral and longitudinal axes of said helicopter, said helicopter having a manually operable control lever, in combination, differential means having two input sections and a power operated output section connected to said movable means, connections from said manually operable control lever to one input section of said differential means; motor means operatively connected to the second input section for positioning said second input section, means including a balanceable network connected to the motor means for operating said motor means on unbalance of the network, an angular position change rate responsive device supplying a unidirectional voltage whose polarity varies with the direction and rate of change of angular position of said helicopter about an axis, an electrical lag network having an input connected to the device and thus energized from said unidirectional voltage and having an output supplying a control signal to said balanceable network, and signal means operated by said movable means and connected to said network and supplying thereto a unidirectional voltage proportional to the direction and extent of operation of said movable means.

4. In control apparatus for a dirigible craft having a differential means comprising an output member connected to a control device on said craft for controlling craft attitude about an axis thereof and two input members; a manually operable control lever operatively connected to the differential means for positioning one input member; motor means operatively connected to the differential means for operating said other input member; a balanceable electrical network connected to the motor means for controlling the direction of operation of said motor means; means in said network and connected to the lever for unbalancing said network in accordance with the extent of operation of said control lever; a rate of change of attitude device supplying a unidirectional voltage of a polarity and magnitude corresponding with the direction and magnitude of rate of change of angular position of said craft about an axis, a time delay electrical lag network comprising a resistor and capacitor connected in series across said unidirectional voltage device; and means for connecting the junction of said resistor and capacitor to said balanceable network for supplying a further signal to the balanceable network.

5. In a helicopter having a sustaining rotor with variable pitch blades mounted thereon and movable means adapted to cyclically vary the pitch of the blades to control the attitude of flight of said helicopter, in combination, a control lever; motor means for positioning said movable means; a balanceable network connected to the motor means for controlling operation of said motor means; means connected to the lever and network for unbalancing said network in accordance with the operation of the manually operable control lever on said craft; means for rebalancing said network and operated by said motor means; rate gyrosignal producing means for deriving a unidirectional voltage variable in polarity in accordance with the direction of attitude change and variable in magnitude in accordance with the rate of change of attitude of said craft about an axis; a time delay electrical lag circuit comprising a resistor and condenser connected in series across said rate gyro signal means and energized from said unidirectional voltage; and means for connecting the electrical junction of said resistor and capacitor and the opposite electrical end of said capacitor to said balanceable network to supply a signal substantially proportional to the integration of the unidirectional voltage to said network, the values of the resistor and the condenser being selected to provide an output voltage across said condenser that effects through said motor means adequate damping at the natural frequency of vibration of the helicopter.

6. In a control apparatus for a dirigible craft having means for changing craft attitude about an axis in combination, a hydraulic differential servomotor for positioning said attitude changing means, a balanceable network connected to the servomotor for controlling said servomotor on unbalance of the network, means for unbalancing said network in accordance with the operation of a manual control lever and for directly controlling said servomotor, means in said network driven by said servomotor to rebalance said network, to effect a change in craft attitude, a rate of change of attitude gyroscope, a voltage signal generator operated thereby and producing a direct voltage proportional to the direction and extent of operation of said gyroscope, a time delay electrical lag network comprising a resistor and condenser connected in series across said generator and energized from said voltage, and connections from the junction of said resistor and condenser and the remaining end of said condenser to said network to supply an additional signal, whereby the output voltage across the condenser and applied to said network stabilizes the flight of the craft and said manual control lever may be operated to supplement the attitude stabilization provided by the output across said condenser.

7. An apparatus for operating the control surfaces of a dirigible craft to change attitude thereof about an axis, in combination, a hydraulic differential force amplifying arrangement structure having two control inputs and one controlled output, said output being adapted for positioning said surfaces, a manually operable controller for variably positioning one input of said hydraulic differential arrangement, position maintaining means; a balanceable signal voltage providing means operable by the position maintaining means for variably controlling said other differential input, and operating connections from said manual controller to said signal voltage providing means and effective on operation of said manual controller to oppose the effect of the position maintaining means to insure that the position maintaining means will not effectively oppose the change in attitude initiated from the manual controller.

8. A hydraulic differential servomotor for positioning a control surface of an aircraft comprising: a pair of reciprocating servomotors each having a cylinder and piston with their respective cylinders integrally connected, means for connecting the piston of a first servomotor to a support, means for connecting the piston of the second servomotor to the control surface, a slidable valve for each servomotor having its housing integral with its cylinder, a differential lever, mounting means for pivotally mounting one end of said lever on said first servomotor cylinder, means for connecting an intermediate portion of said lever to the control valve of the first servomotor, means for connecting the opposite end of said lever to a control column of said aircraft, stop means on said first cylinder receiving said differential lever to permit limited movement of said lever relative to said cylinder, means for positioning the control valve of the second servomotor, a fluid pressure line connected to each valve housing; releasable centering means connecting said second piston to its cylinder for locking said second piston rod relative to its cylinder, pressure responsive means connected to the centering means and pressure line and operated by the supply pressure to said hydraulic servomotors for rendering said centering means ineffective, whereby upon loss of hydraulic pressure, the piston rod of said second cylinder may be centered and locked relative thereto to provide substantially the same positional relationship between the manual control means of said craft and said control surface.

9. In control apparatus for a dirigible craft in combination, a differential servomotor having independently operable sections adapted to control the attitude of the craft about its longitudinal axis, a second differential servomotor for controlling the heading of the craft, position maintaining means adapted to control the operation of a section of each of said first and second differential servomotors, a vertical gyroscope adapted to operate said position maintaining means to maintain craft attitude, manually operable means connected to the other section of each servomotor for operating the first and second differential servomotors to place said craft in a banked turn, and means operated by said manual means and connected to the position maintaining means for opposing the operation of said vertical gyroscope in said stabilizing means to prevent it opposing the manually initiated bank turn.

10. In control apparatus for a dirigible craft in combination, a two section differential servomotor having independently operable sections adapted to control the angular position of said craft about an axis thereof, control means including a balanceable voltage network for operating one section of said servomotor, a rate of change of angular position gyroscope, signal means operated by said gyroscope for generating a unidirectional electrical voltage, a modifying network comprising a first and second resistor and a condenser all connected in series in the order of their recitation across said signal means and energized from said generated voltage, means for connecting the junction of said two resistors and a terminal of said network adjacent said condenser to said balanceable network to supply a voltage having angular rate and integrated angular rate components thereto, manually operable means for generating a second unidirectional voltage, a second modifying network having a first condenser, a resistor, and second condenser connected in series in the order of their recitation across said manually operable means and energized from said second generated voltage, and connections from the junction of said first condenser and resistor and from the condenser and manually operable means to said balanceable network whereby operation of said manual controller directly on the other servomotor section controls said servomotor and additionally operates said manually operable generator whereby said second modifying network supplies to said balanceable network an output voltage which effectively balances the voltage from said first modifying network to said balanceable network due to rate of angular movement resulting from operation of the manually operable means.

11. In control apparatus for a dirigible craft having a control surface for controlling attitude thereof, a servomotor adapted to position said surface, manually operable means connected to the servomotor for producing a control of said servomotor corresponding to a desired movement of said craft, attitude stabilizing means including an amplifier having an input circuit and a controller connected to the output of said amplifier for controlling said servomotor, circuit balanceable means controlling the operation of said amplifier, a rate gyroscope operated voltage generator responsive to the motion of said craft, a resistor-capacitor electrical time lag network controlled by said rate gyroscope generator and providing an output proportional to an integration of said rate gyroscope voltage generator response, means for degeneratively feeding said integration voltage to said amplifier circuit means, and manually operable means connected to said balanceable circuit means for opposing said integration voltage in said amplifier circuit means.

12. In a helicopter having a sustaining rotor with adjustable pitch blades and means for adjusting cyclically the pitch of said blades in combination, a servomotor having two sections, each section having a control valve, said servomotor being adapted to operate said cyclic pitch adjusting means, a pilot actuated control column adapted for directly operating one valve to differentially operate said servomotor, follow-up means responsive to said servomotor operation for nulling the operation of the valve, stabilizing means for operating the control valve of the other section for also differentially operating said servomotor, attitude means in said stabilizing means tending to oppose changes in craft attitude, and additional means in said stabilizing means operated from said control column to oppose the operation of said position maintaining means tending to resist manually initiated changes in craft attitude.

13. In a helicopter provided with a sustaining rotor having adjustable blades and cyclic pitch control means for said blades, in combination, a differential hydraulic servomotor comprising two integrally connected motors each having a control valve for reversely operating its motor, the output member of one motor being connected to said helicopter and the output member of the other motor being connected to said cyclic pitch control means, means having limited movement relative to said first motor for directly mechanically adjusting a control valve of the first motor from the pilot control column of the helicopter, attitude position maintaining means for operating the control valve of the second motor, and centering means connected between the second motor and its output member and responsive to failure of hydraulic pressure for said motors to effect centering and locking of said second output member and its motor on operation of said adjusting means whereby direct operation of said cyclic pitch control from said control column may be effected and the positional relationship of said control column and said cyclic pitch control means is restored.

14. Control apparatus for an aircraft having a control surface operable to change attitude of said craft, said apparatus comprising: a differential hydraulic servomotor operated from a fluid pressure source and comprising two individual hydraulic servomotors each comprising a cylinder, a piston, and control valve with said cylinders integrally connected so that they are incapable of relative movement and each valve having a housing integral with its respective cylinder; means for securing one piston to a support and the other piston to said control surface; manually operable mechanical means for moving one valve relative to its cylinder to obtain relative movement of both cylinders and said support and opposite relative movement of the moved valve and its cylinder, flight attitude responsive means, means connecting the responsive means and other valve for controlling the other valve therefrom to obtain relative movement of said cylinders and control surface; biased connectible and releasable means between the other piston and its cylinder and held in disconnected position by the fluid pressure for locking the other piston integrally with said cylinders on failure of hydraulic fluid pressure to said control valves.

15. Control apparatus for a dirigible craft having control surfaces for varying angular position of said craft about an axis and a control column, said apparatus comprising: a hydraulic servomotor adapted to position said surfaces, said servomotor being differentially controlled directly, from the conventional control column of said craft or, from an automatic craft attitude stabilizing means; said stabilizing means including a balanceable electrical network having a plurality of signal generators, a resistor-reactor derivative circuit connecting one generator to a signal summing point, a resistor-reactor lag circuit connecting a second such generator and the summing point; an operating connection from the control column to the one signal generator; an angular rate responsive device; operating connections from the angular rate responsive device to the second generator; and means for controlling said servomotor from the signals supplied to the summing point whereby during movement of the control column a voltage signal is provided by the one generator and derivative network to provide a signal in the stabilizing means and an operation thereof tending to assist the operation of the surface derived from movement of the control column directly on the servomotor and whereby when the craft has reached the desired attitude when the column is retained displaced from a normal position the craft is stabilized from the new attitude by the second signal generator and its lag network with no effect provided by the first signal generator and its network.

16. In an automatic pilot for an aircraft, in combination: a differential hydraulic servomotor for positioning a control surface of an aircraft for controlling craft attitude comprising two power sections each having two relatively movable parts comprising an outer and inner part; holding means for connecting one part of one section to the frame of said craft; transmitting means for connecting one part of the remaining power section to said control surface; coupling means for connecting the remaining two parts of the two power sections for operation together; two servomotor control valves; a control valve housing integral with each outer part; a manually operable control member; a valve positioning lever having one end connected to the control column, the other end connected to the two connected parts for movement relative thereto, and an intermediate part connected to one control valve to effect reverse motor control operation of the valve by the two parts relative to that motor control operation of the valve from the control column; and autopilot means for automatically controlling the other valve whereby said control surface is positioned in accordance with the differential operation of each control valve.

17. A differential hydraulic servomotor comprising: a pair of reciprocating type servomotors each comprising a piston and cylinder; coupling means for connecting the cylinders of said servomotors in end to end relationship; holding means for connecting the piston of one servomotor to a support; transmitting means for connecting the piston of said remaining servomotor to the load device; first and second slidable control valves, one for each servomotor operable in the direction of the cylinder length in a housing integral with its cylinder; means for initially displacing the first control valve relative to the cylinder of the first servomotor; follow-up means effective on relative positioning of said first servomotor piston and cylinder due to the displacing of the first valve for decreasing the relative displacement of the first cylinder and first control valve; means for initially displacing the second control valve relative to the cylinder of the second servomotor; and follow-up means effective upon relative positioning of the second piston and cylinder due to displacing of the second valve for reducing the displacement of said second control valve relative to its cylinder; and differential means included in each valve displacing and follow-up arrangement to provide a greater movement of the load device for a given manual movement of the first valve than the movement of the load device from the same given movement of the second valve so that the operation of one control valve may effect greater operation of its servomotor that will override the operation of the load device by the other servomotor due to the positioning of its control valve.

18. In control apparatus for a dirigible craft comprising an actuator adapted to position a control surface of said craft to control attitude thereof, differential movement summing means for controlling said actuator including a direct manual input for supplying one movement and a balanceable voltage, attitude stabilizing means input for supplying a second movement, means operated by a manual controller of said craft for operating said manual input to change craft attitude, a gyroscope responsive to rate of change of angular position, a first voltage signal generator operated by said gyroscope, an integrating electrical network comprising resistors $R_1$, $R_2$, $R_3$, and capacitor $C$ with resistors $R_1$, $R_2$, and $C$ connected across the signal generator and resistor $R_3$ extending from the junction of $R_1$, $R_2$ and said network having a transfer function $$=A\frac{1+T_1 j\omega}{1+T_2 j\omega}$$

where $$T_1 = R_2 C; \quad T_2 = \frac{C\left(R_1 + R_2 + \frac{R_1 R_2}{R_3}\right)}{1+\frac{R_1}{R_3}}$$

and $$A = \frac{R_3}{R_3 + R_1}$$

connected to said generator and energized from said first signal generator and supplying a degenerative voltage to said attitude stabilizing means input tending to cause it to control said differential means to oppose said manual operation, a second voltage signal generator positioned from said manual controller, a second electrical network energized from said second generator and supplying a derivative voltage to said stabilizing means during actual movement of the controller opposing said degenerative voltage, whereby during manual operation of said controller said rate gyroscope operation through said first network is opposed by said manual operation through said second network and during stabilized operation said rate gyroscope supplies through said integrating network a displacement and rate effect on said stabilizing means input.

19. In control apparatus for a helicopter having a sustaining rotor with adjustable pitch blades and apparatus for adjusting the pitch of said blades to control craft attitude, in combination, a servomotor adapted to operate said apparatus to change blade pitch, voltage responsive control means connected thereto for reversibly operating said servomotor, a rate of attitude change gyroscope, a voltage generator operated by said gyroscope to provide a unidirectional voltage having a polarity dependent upon the direction of change in attitude and a magnitude corresponding to the rate of change in attitude, an integrating network comprising a first and second resistor and a condenser connected in series in the order of their recitation across the voltage generator and a third resistor having one end connected to the junction of the first and second resistors and energized from said signal generator, said resistors and condenser constituting an integration network having voltage signal output points comprising the remaining end of said third resistor and the terminal of said series circuit adjacent said condenser, said network having a transfer function $$=A\frac{1+T_1 j\omega}{1+T_2 j\omega}$$

where $$A = \frac{R_3}{R_3 + R_1}; \quad T_1 = R_2 C; \quad T_2 = \frac{C\left(R_1 + R_2 + \frac{R_1 R_2}{R_3}\right)}{1+\frac{R_1}{R_3}}$$

where $R_1$=the first resistor, $R_2$ the second resistor, $R_3$ the third resistor, and $C$ the capacitor, and means connecting the network output points to the control means for operating said control means from the output of said integration network.

References Cited in the file of this patent

UNITED STATES PATENTS 1,966,170    Greene   ---------------- July 10, 1934

(Other references on following page)

UNITED STATES PATENTS

| | | |
|---|---|---|
| 2,005,530 | Boykow | June 18, 1935 |
| 2,272,725 | Overbeke | Feb. 10, 1942 |
| 2,439,198 | Bedford | Apr. 6, 1948 |
| 2,443,192 | Moeller | June 15, 1948 |
| 2,445,343 | Tyra | July 20, 1948 |
| 2,479,549 | Ayres et al. | Aug. 23, 1949 |
| 2,480,036 | Lloyd et al. | Aug. 23, 1949 |
| 2,503,346 | Meredith | Apr. 11, 1950 |
| 2,550,538 | Doman | Apr. 24, 1951 |
| 2,619,623 | Meredith | Nov. 25, 1952 |
| 2,621,872 | Terdina et al. | Dec. 16, 1952 |

OTHER REFERENCES

"Theory of Servomechanisms" (James, Nichols and Phillips), published by McGraw-Hill Book Co., New York, 1947 (pages 114 and 115 relied on).